(12) United States Patent
Guo et al.

(10) Patent No.: US 10,272,538 B2
(45) Date of Patent: Apr. 30, 2019

(54) ABRASIVE PRODUCT WITH A CONCAVE-CONVEX STRUCTURE AND PREPARATION METHOD THEREOF

(71) Applicant: Beijing Grish Hitech Co., Ltd., Beijing (CN)

(72) Inventors: Bingli Guo, Beijing (CN); Feifei Sheng, Beijing (CN)

(73) Assignee: Beijing Grish Hitech Co., Ltd., Beijing (CN)

( * ) Notice: Subject to any disclaimer, the term of this patent is extended or adjusted under 35 U.S.C. 154(b) by 138 days.

(21) Appl. No.: 14/430,135

(22) PCT Filed: Aug. 8, 2013

(86) PCT No.: PCT/CN2013/081069
§ 371 (c)(1),
(2) Date: Mar. 20, 2015

(87) PCT Pub. No.: WO2014/044090
PCT Pub. Date: Mar. 27, 2014

(65) Prior Publication Data
US 2015/0239090 A1    Aug. 27, 2015

(30) Foreign Application Priority Data
Sep. 20, 2012   (CN) .......................... 2012 1 0352129

(51) Int. Cl.
B24B 37/24   (2012.01)
B24B 37/22   (2012.01)
(Continued)

(52) U.S. Cl.
CPC ............ *B24B 37/245* (2013.01); *B24B 37/22* (2013.01); *B24B 37/26* (2013.01); *B24D 3/28* (2013.01);
(Continued)

(58) Field of Classification Search
CPC .......... B24D 11/00; B24D 11/01; B24D 3/00; B24D 11/02; B24D 18/0009; B24B 37/245; B24B 37/22; B24B 37/26; B24B 37/28
(Continued)

(56) References Cited

U.S. PATENT DOCUMENTS

| 8,444,458 B2 | 5/2013 | Culler et al. |
| 2002/0019199 A1 * | 2/2002 | Goers ..................... B24B 7/241 451/41 |

(Continued)

FOREIGN PATENT DOCUMENTS

| CN | 101096080 A | 1/2008 |
| CN | 201015846 Y | 2/2008 |

(Continued)

OTHER PUBLICATIONS

International Search Report issued in PCT/CN2013/081069 dated Nov. 21, 2013 (6 pages).
(Continued)

*Primary Examiner* — Monica Carter
*Assistant Examiner* — Lauren Beronja
(74) *Attorney, Agent, or Firm* — Osha Liang LLP

(57) ABSTRACT

An abrasive product with a concave-convex structure includes laminated three planar layers and an abrasive layer with a concave-convex structures located on an upper surface of the three planar layers. The abrasive layer with a concave-convex structure is an array of abrasive blocks, and a groove serving as chips discharging groove is formed between each two adjacent abrasive blocks. The abrasive block includes a binder and abrasive grains distributed in the binder.

3 Claims, 1 Drawing Sheet

(51) Int. Cl.
  *B24B 37/26* (2012.01)
  *B24D 11/00* (2006.01)
  *B24D 3/28* (2006.01)
  *B29C 39/10* (2006.01)
  *B29C 39/12* (2006.01)
  *B29L 9/00* (2006.01)
  *B29L 31/16* (2006.01)
  *B29L 31/28* (2006.01)

(52) U.S. Cl.
  CPC .......... *B24D 11/00* (2013.01); *B24D 11/001* (2013.01); *B29C 39/10* (2013.01); *B29C 39/123* (2013.01); *B29L 2009/00* (2013.01); *B29L 2031/16* (2013.01); *B29L 2031/28* (2013.01)

(58) Field of Classification Search
  USPC .................. 451/295, 297, 307, 308, 298
  See application file for complete search history.

(56) References Cited

U.S. PATENT DOCUMENTS

| | | | |
|---|---|---|---|
| 2004/0137831 A1 | 7/2004 | Kollodge et al. | |
| 2004/0212269 A1* | 10/2004 | Decristofaro | H01F 1/15375 310/216.065 |
| 2007/0243802 A1* | 10/2007 | Petersen | B24D 15/04 451/514 |
| 2008/0318506 A1* | 12/2008 | Brown | B24D 11/00 451/539 |
| 2009/0325470 A1 | 12/2009 | Petersen | |
| 2010/0151196 A1* | 6/2010 | Adefris | C09K 3/1409 428/142 |
| 2013/0298471 A1* | 11/2013 | Cai | B24D 3/28 51/295 |

FOREIGN PATENT DOCUMENTS

| | | | |
|---|---|---|---|
| CN | 101704224 A | | 5/2010 |
| CN | 101817172 A | | 9/2010 |
| CN | 102862128 A | | 1/2013 |
| JP | 06048097 A | * | 2/1994 |
| JP | 4618896 B2 | | 1/2011 |
| JP | 2011-507717 A | | 3/2011 |
| JP | 2011-526845 A | | 10/2011 |
| WO | 00/64633 A2 | | 11/2000 |
| WO | 2009/088606 A2 | | 7/2009 |
| WO | 2010/002697 A2 | | 1/2010 |

OTHER PUBLICATIONS

Written Opinion of the International Searching Authority issued in PCT/CN2013/081069 dated Nov. 21, 2013 (7 pages).

International Preliminary Report on Patentability from PCT/CN2013/081069 dated Jan. 30, 2015 (15 pages).

Office Action issued in corresponding Japanese Application No. 2015-532282 dated Apr. 4, 2017, and English translation thereof (6 pages).

Extended European Search Report issued in corresponding European Application No. 13838515.8 dated Oct. 14, 2015 (6 pages).

* cited by examiner

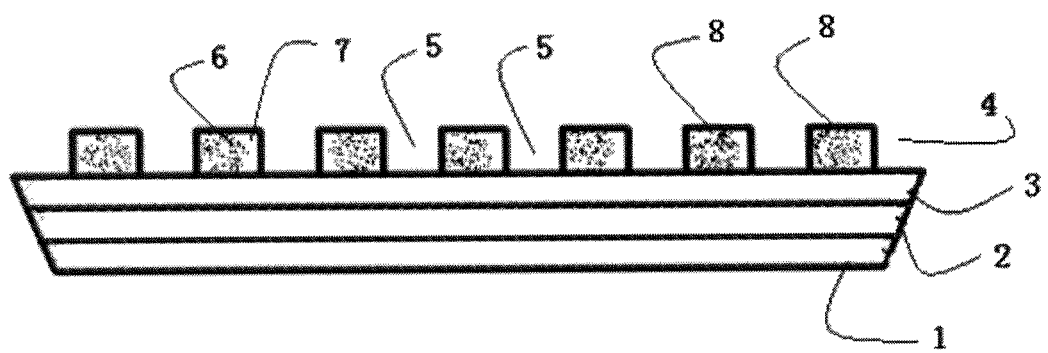

ABRASIVE PRODUCT WITH A CONCAVE-CONVEX STRUCTURE AND PREPARATION METHOD THEREOF

CROSS REFERENCE TO RELATED APPLICATIONS

This is a national stage application based on PCT/CN2013/081069, filed on Aug. 8, 2013, which claims priority to Chinese Patent Application No. CN 201210352129.X, filed on Sep. 20, 2012. This application claims the benefits and priority of these prior applications and incorporates their disclosures by reference in their entireties.

FIELD OF THE INVENTION

The present invention relates to a cleaning technology of liquid crystal panel by grinding, and especially relates to an abrasive product with a concave-convex structure and preparation method thereof.

BACKGROUND OF THE INVENTION

In recent years, TFT-LCD liquid crystal panels has been widely used. Liquid crystal displays are used in various products, such as televisions, cell phones, computers, digital cameras and so on. Liquid crystal displays have deeply entered into each field of our life. At present, the most common one is the TFT (Thin Film Transistor) type liquid crystal display which realizes independent and precise control of each pixel through an active switch, thus can realize subtler display effect compared with passive drive (commonly known as Pseudo-color) in the past. The TFT-LCD process is divided into three segments: an Array process, a Cell process, and a Module Assembly process. In the Cell process, impurities such as stubborn cullet, residual adhesive, oil stain, residual liquid crystal and the like are always left on the surface of a substrate after liquid crystal filling, end sealing, cutting and edge grinding, and such impurities must be cleaned clearly before attaching polarizers. If the residual impurities can't be effectively removed from the surface of the substrate, undesirable phenomenon will occur, such as short circuit between metal layers, falling-off or residual in large areas of the metal layer and the like, which will finally influence various electrical properties of products. At early stage, the impurities were manually removed by wiping with a dust-free cloth, scraping with blades and the like, which have drawbacks of low efficiency and easily cause scratches to the panel, thereby it cannot satisfy production requirement of production line at high-tech age.

At present, there are mainly two technology methods for cleaning the panel prior to attaching polarizers in the Cell process of liquid crystal panel. In a first method, the panel is cleaned by brush cleaning, which removes impurities by taking advantage of friction between a brush and a glass substrate. Brush cleaning can easily remove stubborn dirt and stains from the glass substrate, and has a good effect for removing inorganic particles which are larger than 5 um and tightly adsorbed on the glass substrate, but has limited ability for removing small granule impurities, organic residual adhesives, mark calligraphy and the like. The brush must be kept clean when in use, thus preventing recontamination of the glass substrate due to the dirt on the brush. Generally, a brush has a short service life, and will lose hair after using for a period of time, thus requiring regular replacement. In a second method, the panel is cleaned by grinding with a textile polishing cloth. The textile polishing cloth is a coated grinding consumable, which has a coating layer having grinding ability on a surface thereof, wherein the coating layer forms pits evenly distributed along the warp and weft of the textile cloth. During in use, the coating layer having grinding ability contacts the glass substrate, and can well remove the impurities on the surface of the glass substrate at a certain pressure. The pits on the surface of the textile polishing cloth can contain the impurities and grinding chips and the like which are cleaned off, thus can effectively avoid scratching the panel to some extent. However, since the grinding coating layer is prepared by a coating method, the distribution of the grinding layer in a cloth base is random and uneven, which results in instability of cleaning ability. Moreover, the pits on the surface of the textile polishing cloth have a limited ability for containing the grinding chips, and will result in scratch of the glass substrate once beyond the ability. Generally, the textile polishing cloth is a single-layer coating cloth, which only has one life and has a short service life.

SUMMARY OF THE INVENTION

The present invention, in light of the drawbacks and shortcomings in prior art, provides an abrasive product with a concave-convex structure and preparation method thereof. The abrasive product with a concave-convex structure has a continuous and stable cutting force and a long service life, and will not cause scratch on the glass substrate when the abrasive product with a concave-convex structure is used to clean a LCD liquid crystal panel.

The technical solution of the present invention is as follows:

An abrasive product with a concave-convex structure, comprising laminated three planar layers, and an abrasive layer with a concave-convex structure located on an upper surfaces of the three planar layers, wherein, the abrasive layer with a concave-convex structure is an array of abrasive blocks, a groove serving as chips discharging groove is formed between each two adjacent abrasive blocks, and the abrasive block comprises a binder and abrasive grains distributed in the binder.

In a class of this embodiment, the abrasive grains are selected from the group consisting of alumina, aluminum hydroxide and/or cerium oxide.

In a class of this embodiment, the abrasive grain has a diameter of 1-30 μm.

In a class of this embodiment, the binder comprises a photocurable adhesive selected from the group consisting of acrylate oligomers, methyl acrylate oligomers, acrylic monomers, methacrylic monomers and mixtures thereof; and a heat curable adhesive selected from the group consisting of polyester polyol, polyether polyol, acrylic polyol and mixtures thereof.

In a class of this embodiment, the three planar layers comprises an anti-skid layer, a backing layer and a make layer, in a direction from bottom to top.

In a class of this embodiment, the backing layer is made of a flexible material selected from the group consisting of a polyester film, a polycarbonate film and a polyvinyl chloride film.

In a class of this embodiment, the make layer comprises an adhesive selected from the group consisting of photocurable acrylate oligomers, heat curable polyurethane resin, ethylene-acrylic copolymer emulsion and mixtures thereof;

and nanoparticles selected from the group consisting of nano-silica, ultrafine calcium carbonate, ultrafine alumina and mixtures thereof.

In a class of this embodiment, the anti-skid layer comprises an adhesive selected from the group consisting of polyester polyol, acrylic acid, epoxy resin, and mixtures thereof; and a filler selected from the group consisting of titanium white powder, heavy calcium powder, alumina, and mixtures thereof.

A preparation method of an abrasive product with a concave-convex structure, comprising the following steps:

(1) uniformly dispersing a binder, abrasive grains and an additive by ultrasonic method or stirring to form a slurry;

(2) placing the uniformly dispersed slurry into a concave mold having a certain shape;

(3) attaching a backing coated with a make layer onto the concave mold full of the slurry;

(4) curing the slurry by light to form a certain shape in a cavity of the mold;

(5) separating the molded slurry along with the backing coated with the make layer from the concave mold;

(6) curing by heating at a certain temperature to obtain the abrasive product with a concave-convex structure.

In a class of this embodiment, the concave mold is a metal having regular-shaped pits on a surface obtained by machining method or laser engraving.

The present invention has following technical effects:

the present invention provides a novel abrasive product with a concave-convex structure for cleaning LCD and a preparation method thereof, Using the abrasive product for cleaning panel in the Cell process of the TFT-LCD process can solve the problems that brush cleaning in prior art has poor cleaning ability and short service life, and also solve the problems that the textile polishing cloth in prior art has unstable cleaning ability and short service life and easily causes panel scratches. The abrasive product adopts the light-heat double curable adhesive system, taking advantages of the two types of adhesives and overcoming respective drawbacks thereof, so that the abrasive product has a better bonding strength, a stable cleaning ability and a longer service life, and thus has a high efficient, stable and persistent cleaning ability during the cleaning process of the liquid crystal panel.

BRIEF DESCRIPTION OF DRAWINGS

FIG. 1 is a schematic view of an abrasive product with a concave-convex structure of the present invention.

The reference numerals are as follows:

1—anti-skid layer; 2—backing layer; 3—make layer; 4—abrasive layer with a concave-convex structure; 5—chips discharging groove; 6—abrasive grain; 7—binder; 8—abrasive block.

DETAILED DESCRIPTION OF THE EMBODIMENTS

The present invention will be illustrated with reference to the drawings (FIG. 1).

FIG. 1 is a schematic view of an abrasive product with a concave-convex structure of the present invention. As shown in FIG. 1, the abrasive product with a concave-convex structure comprises laminated three planar layers and an abrasive layer with a concave-convex structure 4 located on an upper surface of the three planar layers. The abrasive layer with the concave-convex structure 4 is an array of abrasive blocks 8, and a groove serving as chips discharging groove 5 is formed between each two adjacent abrasive blocks in the array of abrasive blocks 8. The abrasive block 8 comprises a binder 7 and abrasive grains 6 distributed in the binder. The abrasive grains 6 are alumina, aluminum hydroxide and/or cerium oxide. The abrasive grain 6 has a diameter of 1-30 μm. The binder 7 comprises a photocurable adhesive and a heat curable adhesive, wherein the photocurable adhesive is selected from the group consisting of acrylate oligomers, methyl acrylate oligomers, acrylic monomers, methacrylic monomers and mixtures thereof, and the heat curable adhesive is selected from the group consisting of polyester polyol, polyether polyol, acrylic polyol and mixtures thereof. The three planar layers, in a direction from the bottom to the top, comprises an anti-skid layer 1, a backing layer 2 and a make layer 3. The backing layer 2 is made of a flexible material selected from the group consisting of a polyester film, a polycarbonate film and a polyvinyl chloride film. The make layer 3 comprises an adhesive and nanoparticles, wherein the adhesive of the make layer is selected from the group consisting of photocurable acrylate oligomers, heat curable polyurethane resin, ethylene—acrylic copolymer emulsion and mixtures thereof; and the nanoparticles of the make layer 3 are selected from the group consisting of nano-silica, ultrafine calcium carbonate, ultrafine alumina and mixtures thereof. The anti-skid layer 1 comprises an adhesive and a filler, wherein the adhesive of the anti-skid layer 1 is selected from the group consisting of polyester polyol, acrylic acid, epoxy resin and mixtures thereof; and the filler of the anti-skid layer 1 is selected from the group consisting of titanium white powder, heavy calcium powder, alumina, and mixtures thereof.

A preparation method of an abrasive product with a aconcave-convex structure comprises the following steps:

(1) uniformly dispersing a binder, abrasive grains and an additive by ultrasonic method or stirring to form a slurry;

(2) placing the uniformly dispersed slurry into a concave mold having a certain shape;

(3) attaching a backing coated with a make layer onto the concave mold full of the slurry;

(4) curing the slurry by light to form a certain shape in a cavity of the mold;

(5) separating the molded slurry along with the backing coated with the make layer from the concave mold; and (6) curing by heating at a certain temperature to obtain the abrasive product with a concave-convex structure.

The concave mold is a metal having regular-shaped pits on a surface thereof obtained by machining method or laser engraving.

Hereby it should be noted that, the above description contributes to understanding of the present invention for the skilled in the art, but does not limit the protection scope of the present invention. All alterations, modifications and equivalent arrangements without departing from substantial contents of the present invention are all within the protection scope of the present invention.

The invention claimed is:

1. An abrasive product with a concave-convex structure, comprising
laminated three planar layers, and
an abrasive layer with a concave-convex structure, located on an upper surface of the three planar layers, wherein the abrasive layer with a concave-convex structure is an array of abrasive blocks, a groove serving as chips discharging groove is formed between each two adjacent abrasive blocks, and the abrasive block consists of a binder and abrasive grains distributed in the binder, the abrasive grain has a diameter of 1-30 μm, and the abrasive grain is selected from the group consisting of alumina, aluminum hydroxide, and cerium oxide;

the binder consists of a photocurable adhesive and a heat curable adhesive, wherein the photocurable adhesive is selected from the group consisting of acrylate oligomers, methyl acrylate oligomers, acrylic monomers, methacrylic monomers, and a mixture thereof; and the heat curable adhesive is selected from the group consisting of polyester polyol, polyether polyol, acrylic polyol, and a mixture thereof;

the three planar layers comprise an anti-skid layer, a backing layer, and a make layer in a direction from bottom to top; and the make layer consists of an adhesive and nanoparticles, wherein the adhesive is selected from the group consisting of photocurable acrylate oligomers, heat curable polyurethane resin, ethylene-acrylic copolymer emulsion, and a mixture thereof; and the nanoparticles are selected from the group consisting of nano-silica, ultrafine calcium carbonate, ultrafine alumina, and a mixture thereof.

2. The abrasive product with a concave-convex structure according to claim 1, wherein the backing layer is made of a flexible material selected from the group consisting of a polyester film, a polycarbonate film, and a polyvinyl chloride film.

3. The abrasive product with a concave-convex structure according to claim 1, wherein the anti-skid layer comprises
an adhesive selected from the group consisting of polyester polyol, acrylic acid, epoxy resin, and a mixture thereof; and
a filler selected from the group consisting of titanium white powder, heavy calcium powder, alumina, and a mixture thereof.

\* \* \* \* \*